Feb. 21, 1950 — R. H. RINES — 2,497,913
RANGE AND ELEVATION COMPUTING SYSTEM
Filed April 2, 1947 — 2 Sheets-Sheet 2

INVENTOR.
Robert H. Rines.
BY
Attorney.

Patented Feb. 21, 1950

2,497,913

UNITED STATES PATENT OFFICE 2,497,913

RANGE AND ELEVATION COMPUTING SYSTEM

Robert Harvey Rines, Brookline, Mass.

Application April 2, 1947, Serial No. 738,989

34 Claims. (Cl. 235—61)

The present invention relates to electric methods and systems, and more particularly to methods and systems designed electrically to solve trigonometric problems. The present application is a continuation-in-part of applications Serial No. 502,068, filed September 11, 1943, now abandoned, and Serial No. 540,712, filed June 16, 1944.

It is frequently desirable, given the range and elevation of an aircraft or other object, to determine its height and ground range. In order for heavy anti-aircraft guns to fire accurately, for example, it is necessary to know two things: first, the height H of the aircraft above the ground; and, secondly, the horizontal or ground range G, or the distance of the aircraft from the gun, measured along the ground. These values of H and G are continuously varying, for the aircraft is in continual motion.

The gun crew does not, however, know the value of either the height H or the ground range G of the aircraft. All that it has to work with is a visual or a radio-location indication of the presence of the airplane, together with range-finding equipment for measuring the instantaneous values of the angle $\alpha$ of elevation of the aircraft, and of its slant range R, the distance in space between the gun and the aircraft. These instantaneous values of the angle $\alpha$ of elevation and the range R are accurately supplied by the range-finding equipment continuously. In order to bring down the aircraft, the gun crew must promptly and continuously find the corresponding instantaneous values of the height H of the aircraft and its ground range G. These instantaneous values are continuously entered into the gun directors to predict future positions of the hostile aircraft. Knowing these future positions it becomes possible, at any particular moment, for the anti-aircraft crew to aim the guns, not at the airplane itself, but toward the position that the airplane will occupy by the time that the shell shall reach that position.

This information is also vital for use in the ground-control interception of hostile craft by night fighters; for the fighters, after attaining the proper altitude, are vectored continuously from the ground until they make contact.

One way to obtain the instantaneous values of H and G from the data supplied by the range-finding equipment, of course, is by trigonometric calculation. There is not time, however, for calculation, because by the time that the calculations have been completed, the aircraft will no longer be where it was when the calculations were begun.

Mechanical aids have, therefore, been devised for converting continuously the given range R and the angle $\alpha$ of elevation of the aircraft into its corresponding height H and ground range G. These, however, are very clumsy and inaccurate.

An object of the present invention, therefore, is, given an angle and the hypotenuse of a right triangle, electrically to determine the legs of the triangle.

Another object is to provide a novel method of electrically solving right triangles.

A further object is to provide a novel electrical height computer and ground-range computer.

Still another object is to provide a novel electrical height computer and ground-range computer that will be operable with range-finding equipment, such as is embodied at a radio-locator system.

Other and further objects will be explained hereinafter and will be particularly pointed out in the appended claims.

The invention will now be more fully explained in connection with the accompanying drawings, in which.

Figure 1:
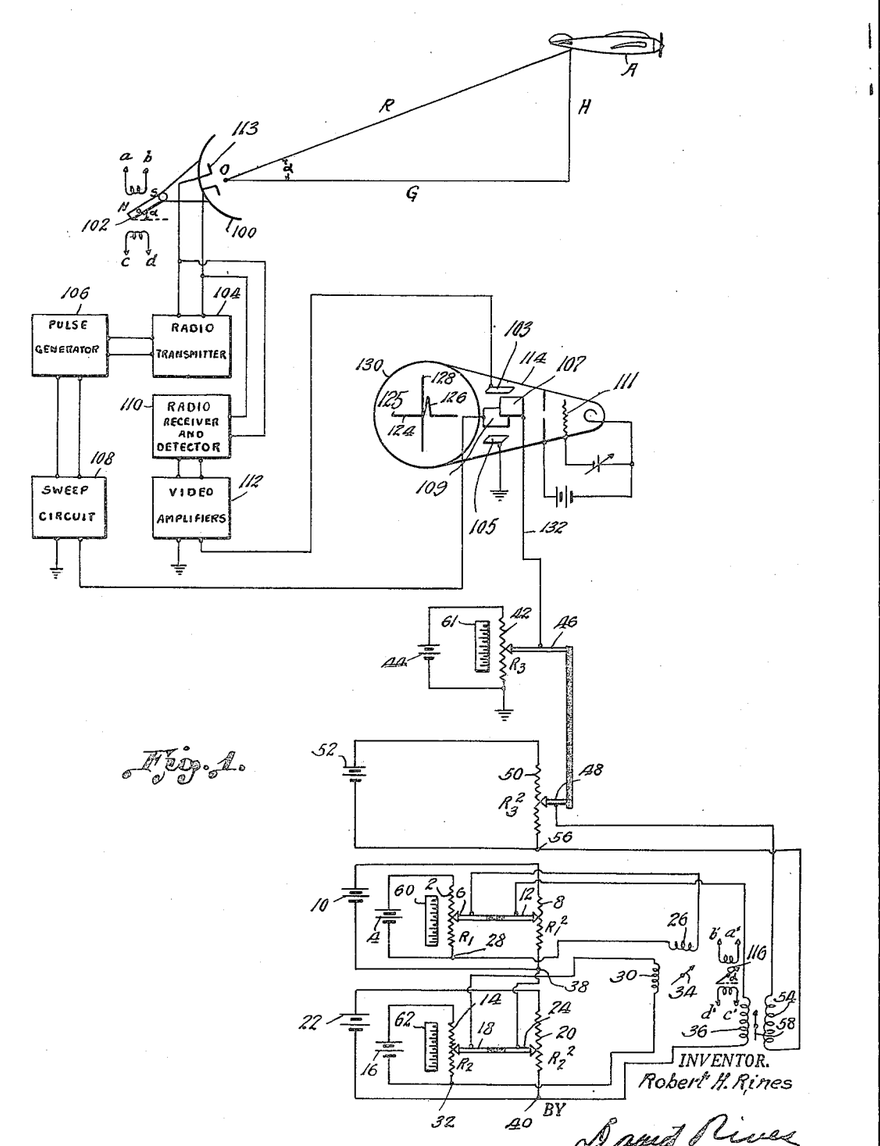
Fig. 1 is a diagrammatic view of a radio-location system for determining the range and the angle of elevation of an airplane, in combination with circuits and apparatus operating with the data thus obtained for determining the height and the ground range of the airplane.

Let it be assumed that an airplane object A is at a slant-range distance R from a point of observation O, and that its elevation is the angle $\alpha$. The point of observation O may be on a ship or on land. The slant range R and the angle $\alpha$ of elevation may be observed in any well-known way as, for example, by means of any well-known radio-location equipment.

The illustrated radio-location equipment comprises a radio-location transmitter 104, shown triggered by a pulse generator 106 to transmit pulses of ultra-high-frequency radio waves to a dipole antenna 113. From the antenna 113, the radio waves are reflected by a directive paraboloidal reflector 100 towards an object, such as the airplane A, from which the waves are reflected and scattered back to the reflector 100. The returned radio pulse echoes, received by the antenna 113, are detected in a radio receiver and detector 110, and amplified by preferably grounded video amplifiers 112.

A cathode-ray-tube 114 is shown provided with an electron gun 111, a pair of horizontally spaced deflection plates 107 and 109, a pair of vertically spaced deflection plates 103 and 105, and a fluorescent screen 130 upon which the electron stream from the electron gun 111 impinges. Magnetic as well as the electrostatic deflection means shown could also be used as is well-known in the art.

The screen 130 is provided with a centrally disposed cross-wire 128. The plate 107 is connected by a conductor 132 to a slider 46. The plate 105 has a grounded connection to the grounded side of the video amplifier output. A time-base sweep 124 is produced on the screen 130 by a sweep-generator circuit 108 connected to the horizontally spaced plates 107 and 109. The sweep circuit 108 is triggered by the pulse generator 106 connected to trigger also the radio transmitter 104. The received echoes are fed from the video amplifiers 112 between the vertically spaced plates 103 and 105. This produces a vertical deflection 126 on the time-base sweep 124 of the screen 130.

The angular position occupied by the directive reflector 100 at the time that the echoes are received determines the angle $\alpha$ of elevation of the object. The directive reflector 100 may be elevated by a radio-location-station operator by means of a handwheel 101, shown in Fig. 4.

The same or another radio-location-station operator, continuously observing the deflection 126, will continuously adjust the potentiometer slider 46 along a range potentiometer 42, comprising a resistor. The resistor is shown supplied with voltage by a battery or any other desired source of energy 44. The operator brings the deflection 126 continuously to the cross-wire 128 on the cathode-ray-tube screen 130. The setting of the slider 46 upon the potentiometer 42, corresponding to a resistance of value $R_3$, is read off on a scale 61. The voltage $V_3$ across the resistance $R_3$, continuously set in the radio-location equipment, is a measure of the slant range R of the airplane object A. Since the distance of the deflection 126 from the initial or starting point 125 of the sweep 124 indicates the range R of the object A, and since the voltage $V_3$ across the resistance $R_3$ of the potentiometer 42 is adjusted to keep the deflection 126 always at the center 128 of the screen 130, this reading of the scale 61 indicates the slant range of the object.

Further details of a conventional radio-location system of this character for continuously determining the slant range R and the angle $\alpha$ of elevation of an object is described in an article by H. G. Foster, entitled, "Radar in A. A. Defence," Electronic Engineering, vol. 18, No. 215, January 1946, pages 2 to 8. The range-potentiometer system 42—46 may also be controlled to gate and track automatically the echo 126 as described, for example in an article, entitled, "The SCR-584 Radar," page 113 of Electronics, McGraw-Hill, February 1946.

The slant range R and the angle $\alpha$ of elevation, thus continuously supplied by the radio-location equipment, cannot be used for gun-directing predictors and for fighter-control operations. For these purposes, it is necessary continuously to convert the slant range R and the angle $\alpha$ of elevation of the right triangle into data representing the height H and ground range G of the aircraft. This data may, of course, be obtained by means of trigonometric tables or a slide rule, but this is too time-consuming. Cams and other mechanical equipment have been employed, but they are too clumsy and awkward.

It is an object of the present invention, therefore, to obtain this information rapidly, accurately, and continuously by electrical means.

According to the embodiment of the invention illustrated in Fig. 1, a potentiometer 2, comprising a resistor, is supplied with voltage from a battery or any other desired source of energy 4. A potentiometer slider 6 cooperates with the potentiometer 2. A terminal 28 of this resistor is disposed adjacent to the zero reading of the potentiometer 2, as observed on a scale 60. Another potentiometer 8 comprises a resistor supplied with voltage from a voltage source 10 and a slider 12. A terminal 38 of this resistor is disposed adjacent to the zero reading of the potentiometer 8. The sliders 6 and 12 are mechanically connected together, though insulated from each other. The potentiometer 8 is so designed, either empirically or by computation, that, to each setting of the slider 6 on the potentiometer 2, providing a resistance value $R_1$, the corresponding setting of the slider 12 on the potentiometer 8 shall yield a resistance value $R_1^2$. The voltage of the battery 10 will therefore produce a voltage $V_1^2$, the square of the voltage $V_1$ across the resistance $R_1$.

A third potentiometer 14, which may be similar to the potentiometer 2, may comprise a resistor supplied with voltage from a battery 16, and having a slider 18. A terminal 32 of this resistor is disposed adjacent to the zero reading of the potentiometer 14, as observed on a scale 62. A fourth potentiometer 20, which may be similar to the potentiometer 8, may comprise a resistor supplied with voltage from a voltage source 22, and having a slider 24. A terminal 40 of this resistor is disposed adjacent to the zero reading of the potentiometer 20. The sliders 18 and 24, like the sliders 6 and 12, are mechanically, though insulatingly, connected together. The potentiometer 20 is so designed that, to each reading $R_2$ of the slider 18, there shall be a corresponding reading $R_2^2$ of the slider 24. The voltage of the battery 22 will therefore produce a voltage $V_2^2$, the square of the voltage $V_2$ across the resistance $R_2$.

The adjustable voltages $V_1$ and $V_2$ of the respective potentiometers 2 and 14 may be considered as first and second voltages, and the adjustable voltages $V_1^2$ and $V_2^2$ of the potentiometers 8 and 20 may be considered as third and fourth voltages, respectively. The voltage of a potentiometer 50 may be considered as a fifth voltage.

A coil 26 is connected between the terminal 28, adjacent to the zero reading of the potentiometer 2, and the slider 6. A coil 30 is similarly connected between the terminal 32, adjacent to the zero reading of the potentiometer 14, and the slider 18. The coils 26 and 30, in accordance with well-known practice, may be so arranged that their magnetic fields shall interact in such fashion as to cause the voltage $V_1$ of the variable voltage source across the resistance $R_1$ to oppose the voltage $V_2$ of the variable voltage source across the resistance $R_2$. This may be effected by having the magnetic fields of the coils 26 and 30 operate at right angles to each other, correspondingly to control the position of a moving coil or magnetic needle or similar device 34. The tangent of the angle of rest of the element 34 will therefore be the ratio $R_2/R_1$ of the resistances $R_2$ and $R_1$ or the ratio $V_2/V_1$ of the voltages $V_1$ and $V_2$, the voltage $V_2$ and the resistance $R_2$ being proportional to the sine of the said angle of rest, and the voltage $V_1$ and the resistance $R_1$ being proportional to the cosine of the said angle of rest. All that is necessary, in order to attain this end, is suitably to adjust the batteries of the potentiometers, or otherwise to adjust the potentiometers, to cause the magnetic fields of the voltages of the variable voltage sources to interact to the predetermined degree.

If $R_2$, for example, is proportional to H, the height of the airplane, and if $R_1$ is proportional to G, its ground range, the element 34 will orient itself along an angle which will be equal to the angle $\alpha$, the elevation of the aircraft. The angle $\alpha$ will then be indicated by the meter 26, 34, 30.

One end of a coil 36 is connected to the terminal 40, adjacent to the zero reading of the potentiometer 20. The other end of the coil 36 is connected to the slider 12. The slider 24 is connected to the terminal 38, adjacent to the zero reading of the potentiometer 8. Since the resistances $R_1^2$ and $R_2^2$ of the potentiometers 8 and 20 are thus connected in series with the coil 36, a voltage becomes impressed across the coil 36 equal in value to $V_1^2+V_2^2$, the sum of the squares of the voltages $V_1$ and $V_2$ appearing across the resistances $R_1$ and $R_2$ on the potentiometers 2 and 14, respectively. The voltage of the coil 36 may be considered as a sixth voltage.

Under the above example, where $R_1$ is proportional to G and $R_2$ to H, the voltage $V_1^2+V_2^2$ across the coil 36 is proportional to a voltage corresponding to $H^2+G^2$.

The slider 46 of the range potentiometer 42 of the radio-location equipment is mechanically connected to, though insulated from, the slider 48 on a potentiometer 50. The potentiometer 50 is so designed, in conjunction with its battery 52, that there shall be tapped off by the slider 48, between the slider 48 and a terminal 56 adjacent to the zero reading on the potentiometer 50, a resistance $R_3^2$ equal to the square of the resistance $R_3$ tapped off by the slider 46 of the range potentiometer 42. There is thus produced a voltage $V_3^2$ equal to the square of the voltage $V_3$ tapped off the range potentiometer 42, and proportional to $R_3^2$.

In addition to the variable voltage sources $V_1$ and $V_2$ across the respective resistance $R_1$ and $R_2$, as before stated, there is the variable voltage source $V_3$, across the resistance $R_3$, constituting, as previously stated, a measure of the range of the object A.

A coil 54, oriented parallel to the coil 36, is subjected to the voltage $V_3^2$. As the voltage $V_3$, corresponding to the resistor setting $R_3$ on the potentiometer 42, is proportional to the voltage corresponding to the range R, the voltage $V_3^2$ across the coil 54 will therefore be proportional to $R^2$.

A needle 58 is influenced by the magnetic fields of the coils 36 and 54, the former of which is proportioned to $V_1^2+V_2^2$, the sum of the squares of the voltages $V_1$ and $V_2$ appearing on the potentiometers 2 and 14, and the latter of which is proportioned to $V_3^2$, the square of the voltage $V_3$ appearing on the potentiometer 42. The needle 58 and the coils 36 and 54 thus provide a further meter 36, 54, 58.

If the voltage across the coil 36 is equal to that across the coil 54, the needle 58 will occupy its zero or null position. In that event, the voltage corresponding to the setting $R_3$ on the potentiometer 42 will be such, along with the settings $R_1$ and $R_2$, that $R^2=H^2+G^2$.

The slider 46 is thus automatically set in the radio-location system so that the setting $R_3$ shall correspond to the range R. The height-finder operator will merely manipulate the sliders 6 and 18 until the needle 34 occupies the angle of elevation $\alpha$. At such times, when the needle 34 occupies the angle $\alpha$, and the needle 58 occupies its zero or null position, therefore, $R_2$ will correspond to the value H and $R_1$ to the value G. The values H and G may, therefore, be directly read off on the height and ground-range representing scales 62 and 60, respectively associated with the potentiometers 14 and 2; or the voltages may be tapped off for use in predicting height and ground-range representing circuits, as is well-known in the art.

It will be observed that the readings of $R_2$, represented on the scale 62, which are proportional to $\sin \alpha$, have been modified in accordance with the adjustment of the range-potentiometer slider 46 to correlate the factor of proportionality to the slant range R, thereby yielding the values $R \sin \alpha$, and that the readings of $R_1$, represented on the scale 60, which are proportional to $\cos \alpha$, have similarly been modified to correlate the factor of proportionality to the slant range R, thereby yielding the values $R \cos \alpha$. The invention, therefore, provides a method of and means for electrically measuring first and second values, namely, the sine and the cosine of an angle $\alpha$, multiplied by any desired factor of proportionality or third-value multiplier R, the value of which is determined by the setting $R_3$. To attain these ends, the voltage of the potentiometer 50 is adjusted to the value $V_3^2$, corresponding to the square of the third value R. The potentiometer 2 is adjusted to produce further voltages $V_1$ that may represent values related by a factor of proportionality to the cosine of the angle $\alpha$, and the potentiometer 14 is adjusted to produce further voltages $V_2$ that may represent values related by a factor of proportionality to the sine of the angle $\alpha$. The ratio of the further voltages $V_2$ and $V_1$ corresponds to the tangent of the angle $\alpha$ and the sum of their squares, $V_1^2+V_2^2$, corresponds to the adjusted voltage $V_3^2$. The voltages $V_2$ and $V_1$ are then measures of the first and second values $R \sin \alpha$ and $R \cos \alpha$.

Figures 3, 4:
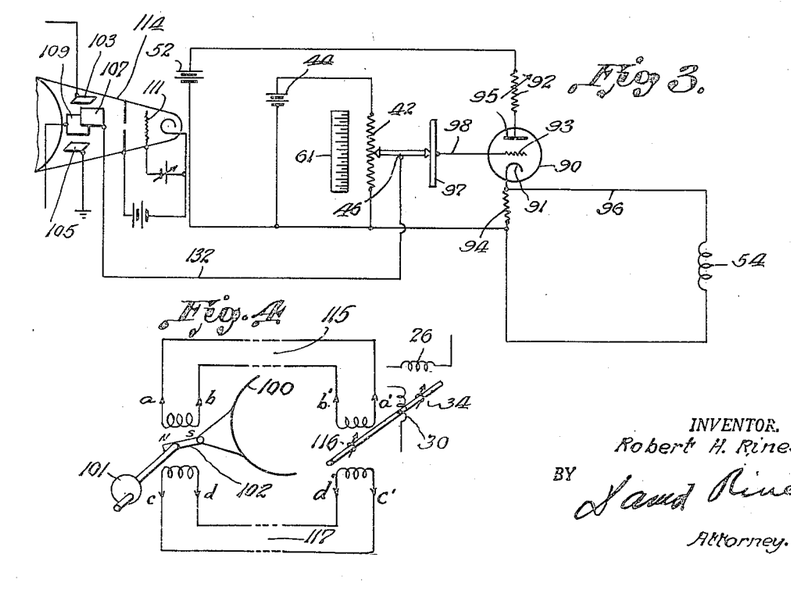
Fig. 4 is a diagrammatic view of the circuits and apparatus of Fig. 1 showing further details.

In practice, the needle 34 may be positioned over or to the side of another needle 116, which is caused automatically to assume the correct orientation $\alpha$ of the elevation-finding equipment. This may be effected in any desired way, as by means of the magnetic fields induced in coils $a$—$b$ and $c$—$d$, Figs. 1 and 4, controlled from a magnet indicator 102 moving with the directive reflector 100. The coils $a$—$b$ and $c$—$d$ are shown in Fig. 4 connected respectively to coils $b'$—$a'$ and $d'$—$c'$ by conductors 115 and 117, respectively. Selsyn indicators supplying this data could also be used, as described, for example, in the above-mentioned electronic-engineering publication. Without even knowing the value of the angle $\alpha$, therefore, the height-finder operator needs merely to synchronize the operation of the needle 34 with the needle 116. The height-finder operator, further, does not know nor does he need to know the values of the slant range R being set in by the radio-location operator, and even the radio-location operator need not know the values of slant range as he keeps the deflection 126 centered on the cross-wire 128.

Though the description above has proceeded upon the assumption that the slant range R and the angle $\alpha$ of elevation have been given, in order to determine the values of the legs H and G of the right triangle, it is obvious that the inverse problem is also soluble electrically according to the present invention; that is, given the legs H and G of the triangle, it is possible to determine electrically the range R and the angle α of elevation. All that would be necessary in order to attain that end, would be first to disconnect the slider 46 from the radio-location equipment, and then to set the sliders 6 and 18 to positions such that the voltages $V_1$ and $V_2$ across the resistors $R_1$ and $R_2$ would be proportional to the values of the legs G and H. The angle occupied by the needle 34 would thereupon be the angle α, and the setting of the slider 46, that would cause the pointer 58 to assume its zero or null position would correspond to the value of the slant range R. This slant range R could then be read off upon the scale 61 associated with the resistor 42.

In similar fashion, the slant range R and one of the legs G and H may be determined, given the other leg and one of the acute angles α. The invention, indeed, provides an electrical solution of the problem of solving right triangles analogous in all respects to the trigonometric solution by calculation.

Figure 2:
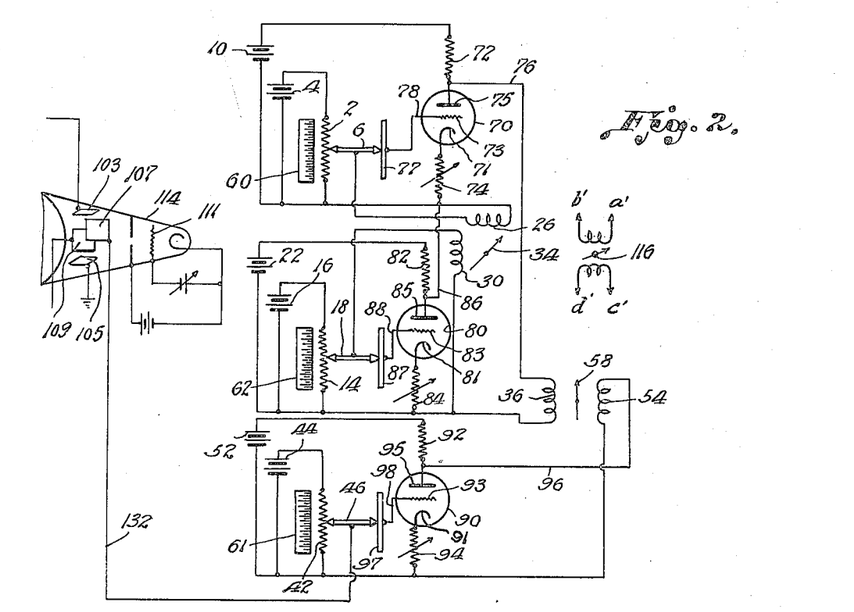
Figs. 2 and 3 are similar views of modified circuits and apparatus.

The potentiometers 8, 20 and 50 may be replaced by other mechanisms for producing the square of the voltages appearing on the potentiometers 2, 14 and 42, respectively. One such preferable mechanism is illustrated in Fig. 2. The potentiometer 8 is shown replaced by a vacuum-tube or electron tube triode 70, operated, in conjunction with a suitable cathode bias 74, and a plate load 72, shown as a resistor, to produce a characteristic curve that obeys the square law. The potentiometers 20 and 50 are similarly replaced, respectively, by vacuum tubes 80 and 90, provided with suitable bias resistors 84 and 94, respectively, and plate loads 82 and 92, respectively, so that the output circuits of the respective triodes 80 and 90 provide voltages corresponding to the squares of the voltage inputs tapped off on the potentiometers 14 and 42, respectively. The circuits operate on the same principle as previously described for the voltage-squaring potentiometers. The cathode resistors 74, 84 and 94 are shown variable to facilitate setting to zero the initial readings on the meters 36, 54, 58, and 26, 34, 30. The tubes 70, 80 and 90 all operate on portions of their square-law characteristic curves sufficiently below the saturation region to prevent the flow of grid current which would upset the meter readings; they operate as potential, rather than current devices, so as not to conduct very freely. The biases are adjusted so that no or few grid-current electrons shall be drawn from the respective cathodes 71, 81 and 91 into the respective grid circuits of any of the tubes over essentially the complete range of the input potentiometers 2, 14 and 42. The control electrodes 73, 83 and 93 should not draw electrons, else they might upset the calibrations of the potentiometers 2, 14 and 42, respectively. This may be effected by suitably designing the bias resistors 74, 84 and 94, and the other elements.

The battery 10 constitutes the B-battery source for the output circuit of the triode 70, which may be traced from one side of the battery 10, through the bias 74, the cathode 71, the anode 75, and the load 72, to the other side of the battery 10. The batteries 22 and 52 constitute, similarly, B-battery sources for the output circuits of the triodes 80 and 90, respectively, comprising the respective cathodes 81 and 91 and the respective anodes 85 and 95.

The high side of the voltage tapped on the potentiometer 2 is fed by the slider 6 to a connector 77 which feeds the control grid 73 of the triode 70 by way of a permanent connection 78. The cathode bias 74 connects to the low side of the potentiometer 2. The voltages tapped on the respective potentiometers 14 and 42 are similarly fed by the respective sliders 18 and 46 which are connected to respective connectors 87 and 97, between the control grids 83 and 93, and the cathodes 81 and 91, respectively, of the respective control-grid circuits. The slider 46, as in the system of Fig. 1, is connected by the conductor 132 to the plate 107 of the cathode-ray-tube 114. The setting of the slider 46 in response to keeping the deflection 126 centered on the cross-wire 128 thus automatically controls the vacuum tube 90.

The voltage in the output circuit, across the bias 74 and the triode 70, or across the load 72 and the battery 10, will then be equal to a constant minus the square of $V_1$, the voltage input, where the constant is essentially the voltage of the B-battery 10. The voltage of the output circuit of the triode 80 will similarly be equal to a constant minus the square of $V_2$, where the voltage of the battery 22 equals the voltage of the battery 10; and the voltage of the output circuit of the triode 90 will be equal to a constant minus the square of $V_3$, where the constant has a value equal to twice the voltage of the battery 10.

The coil 36 is connected in a circuit that is subjected to the voltages of the output circuits of both the triodes 70 and 80. This circuit may be traced from the anode 75 of the triode 70, by way of a conductor 79, through the coil 36 and the bias 84, to the cathode 81 of the triode 80; then to the anode 85 of the triode 80; and, finally, by way of a conductor 86, through the bias 74 to the cathode 71 of the triode 70, and back to the anode 75. The coil 36 will therefore be subjected to a voltage corresponding to $V_1^2 + V_2^2$.

Instead of taking the plate outputs of the square-law-operating vacuum tubes, the tubes 70, 80 and 90 may be used as cathode followers, as shown for the tube 90 in Fig. 3, to give square outputs across their respective cathode loads, such as across the cathode resistor 94 of tube 90.

Other vacuum tubes, such as square detectors, may be similarly used to produce the same results.

The potentiometers 2, 14 and 42 may also similarly be replaced by other voltage-producing devices.

According to the present invention, therefore, all that is necessary, in order to determine the height H and the ground range G of the aircraft A, is for the radio-location operator to keep the deflection 126 on the cross-wire 128 of the cathode-ray-tube screen 130, and for the height finder operator to adjust the potentiometer sliders 6 and 18 so as to keep the needles 34 and 116 aligned and the needle 48 in its null position. Keeping the deflection 126 on the cross-wire 128 automatically effects adjustment of the potentiometer slider 46 from the potentiometer slider 46. With the slider 46 thus automatically set to the proper adjusted position, and with the sliders 6 and 18 adjusted continuously by the operator along the respective potentiometers 2 and 14 so that the needle 34 shall be continuously aligned with the needle 116, the angle of which is automatically maintained by the equipment equal to the angle α of elevation, and so that the pointer 58 maintain the null position indicated, the values R sin α and R cos α may be read continuously along the scales 62 and 60. Corresponding with each setting of the slider 6, there is a setting of the slider 12 on the potentiometer 8, determining the value $G^2$; corresponding to each setting of the slider 18, there is a setting of the slider 24 determining the value $H^2$; and the sum of these values, $H^2+G^2$, is represented in the coil 36. Corresponding to each setting of the range R, furnished by the slider 46, there is a setting of the slider 48 on the potentiometer 50, determining the value of $R^2$, and a voltage corresponding to this value $R^2$ is impressed upon the coil 54. When the needle 58 occupies its illustrated null position, therefore, the relation $R^2=G^2+H^2$ is established. When the pointer 34 is disposed at an angle equal to the angle α of elevation supplied by the range-finding equipment, the ratio of the values G and H read off on the respective potentiometer scales 60 and 62 is equal to the tangent of that angle.

In actual practice, as before explained, all that the height-finder operator has to do is to perform manipulations of the sliders while watching the needles 58 and 34. The apparatus itself automatically does the rest. As the airplane A moves nearer or further away, the slider 46 changes its setting to correspond; and the operator is able at all times to determine the instantaneous values of the ground range G and the height H. The adjustment of the slider 46 of the potentiometer 42 to correspond to the continuously varying slant range R of the distant aircraft A is automatically effected continuously from the range-finding equipment itself, and without the gun crew even knowing its value. The operator may thus concentrate his attention on the continuous adjustment of the needle 34 and the pointer 58.

For plotting-control, the desired instantaneous values of the height H and the ground range G may, at all times, be read off directly and continuously on the scales 62 and 60. The setting of the slider 6 on the potentiometer 2 indicates the value of the ground-range G, as continuously indicated on the scale 60, and the setting of the pointer 18 on the potentiometer 14 the value of the height H, as continuously indicated on the scale 62. As already explained, furthermore, even these readings are not necessary for some purposes, however, for the sliders 6 and 18 may effect control of the anti-aircraft equipment directly, without any knowledge by the operator of either of the values H and G.

Because of the automatic control of the potentiometer 42 by the range-finding equipment, the operator, while adjusting the potentiometers, need only watch the needles 34 and 58, knowing that, whenever these have the proper reading, the setting of the sliders 18 and 6 will give instantaneous values of the height H and the ground range G.

Further modifications will occur to persons skilled in the art, and all such are considered to fall within the spirit and scope of the invention, as defined in the appended claims.

What is claimed is:

1. An electric system for finding the height H and the ground range G of an object with the aid of its angle α of elevation and its range R as obtained from range-finding equipment, the said system comprising three adjustable voltage sources, electric circuits in which currents respectively flow under the influence of the voltages of two of the voltage sources, means for causing the electromagnetic fields of the said currents to act at right angles to each other to facilitate obtaining the ratio of the said values of the voltages of the said two voltage sources, means controlled by the range-finding equipment for adjusting the voltage of the third voltage source to a value corresponding to the square of the range R, and means for adjusting the voltages of the said two voltage sources to values such that their said ratio shall correspond to the tangent of the angle α and such that the sum of their squares shall correspond to the adjusted value of the voltage of the third voltage source, whereby the said adjusted values of the voltages of the said two voltage sources will respectively be measures of the height H and the ground range G.

2. An electric system for finding the height H and the ground range G of an object with the aid of its angle α of elevation and its range R as obtained from range-finding equipment, the said system comprising adjustable first, second, third, fourth and fifth voltage sources, means controlled in accordance with the adjusted values of the voltages of the first and second voltage sources for adjusting the voltages of the third and fourth voltage sources to values corresponding respectively to the squares of the said adjusted values of the voltages of the first and second voltage sources, electric circuits in which currents respectively flow under the influence of the said voltages of the first and second voltage sources, means for causing the electromagnetic fields of the said currents to act at right angles to each other to facilitate obtaining the ratio of the said adjusted values of the voltages of the first and second voltage sources, means controlled by the range-finding equipment for adjusting the voltage of the fifth voltage source to a value corresponding to the square of the range R, and means for adjusting the said voltages of the first and second voltage sources to values such that their said ratio shall correspond to the tangent of the angle α and such that the sum of the said adjusted values of the voltages of the third and fourth voltage sources shall correspond to the said adjusted value of the voltage of the fifth voltage source, whereby the said adjusted values of the voltages of the first and second voltage sources will respectively be measures of the height H and the ground range G.

3. An electric system for finding the height H and the ground range G of an object with the aid of its angle α of elevation and its range R as obtained from range-finding equipment, the said system comprising adjustable first, second, third, fourth and fifth voltage sources, means controlled in accordance with the adjusted values of the voltages of the first and second voltage sources for adjusting the voltages of the third and fourth voltage sources to values corresponding respectively to the squares of the said adjusted values of the voltages of the first and second voltage sources, electric circuits in which currents respectively flow under the influence of the said voltages of the first and second voltage sources, means for causing the electromagnetic fields of the said currents to act at right angles to each other to facilitate obtaining the ratio of the said adjusted values of the voltages of the first and second voltage sources, means for creating a sixth voltage of value corresponding to the sum of the said adjusted values of the voltages of the third and fourth voltage sources, means controlled by the range-finding equipment for adjusting the voltage of the fifth voltage source to a value corresponding to the square of the range R, electric circuits in which currents respectively flow under the influence of the voltage of the fifth voltage source and the sixth voltage, means for causing the electromagnetic fields of the last-named currents to oppose each other, and means for adjusting the said voltages of the first and second voltage sources to values such that their said ratio shall correspond to the tangent of the angle $\alpha$ and such that the value of the sixth voltage shall correspond to the said adjusted value of the voltage of the fifth voltage source, whereby the said adjusted values of the voltages of the first and second voltage sources will respectively be measures of the height H and the ground range G.

4. An electric system for finding a first value and a second value that are respectively equal to a third value multiplied by the sine of an angle and the third value multiplied by the cosine of the angle, the system comprising first, second, third, fourth and fifth potentiometers each having a slider, the sliders of the third and fourth potentiometers being respectively adjustable with the sliders of the first and second potentiometers in order that their settings may represent voltage values respectively corresponding to the squares of the voltage values represented by the settings of the sliders of the first and second potentiometers, electric circuits in which currents respectively flow under the influence of the said voltages of the first and second potentiometers, means for causing the electromagnetic fields of the currents to act at right angles to each other to facilitate obtaining the ratio of the adjusted values of the voltages of the first and second potentiometers, a third electric circuit in which current flows under the influence of the sum of the said voltages of the third and fourth potentiometers, means for adjusting the slider of the fifth potentiometer to a value corresponding to the square of the third value, a fourth electric circuit in which current flows under the influence of the fifth potentiometer, means for causing the electromagnetic fields of the currents in the third and fourth circuits to oppose each other, and means for adjusting the first and second potentiometers so that the ratio of their voltages shall correspond to the tangent of the angle and such that the currents in the third and fourth electric circuits shall be equal, whereby the adjustments of the first and second potentiometers will respectively be measures of the first and second values.

5. An electric system for finding a first value and a second value that are respectively equal to a third value multiplied by the sine of an angle and the third value multiplied by the cosine of the angle, the system comprising two adjustable voltage sources, electric circuits in which currents respectively flow under the influence of the voltages of the voltage sources, means for causing the electromagnetic fields of the currents to act at right angles to each other to facilitate obtaining the ratio of the said values of the voltages of the voltage sources, an electron tube operating according to the square law, means for connecting the electron tube to produce a voltage of value corresponding to the square of the third value, and means for adjusting the voltages of the voltage sources to values such that their said ratio shall correspond to the tangent of the angle and such that the sum of their squares shall correspond to the adjusted value of the voltage of the electron tube, whereby the said adjusted values of the voltages of the voltage sources will respectively be measures of the first and second values.

6. An electric system comprising two adjustable voltage sources, electric circuits in which currents respectively flow under the influence of the voltages of the voltage sources, means for causing the electromagnetic fields of the currents to act at right angles to each other to facilitate obtaining the ratio of the said values of the voltages of the voltage sources, an electron tube operating according to the square law to produce a voltage, means for producing a voltage equal to the sum of the squares of the voltages of the voltage sources, and means for adjusting the voltages of the voltage sources to values such that their said ratio shall correspond to a predetermined value and such that the sum of their squares shall correspond to the value of the voltage produced by the electron tube.

7. An electric system comprising two adjustable voltage sources, electric circuits in which currents respectively flow under the influence of the voltages of the voltage sources, means for causing the electromagnetic fields of the currents to act at right angles to each other, electron-tube means operating according to the square law and connected to the respective voltage sources to produce voltages of values respectively corresponding to the squares of the voltages of the respective voltage sources, and means for producing a voltage equal to the sum of the said squares.

8. An electric system comprising two potentiometers each having a slider, electric circuits in which currents respectively flow under the influence of the voltages of the potentiometers, means for causing the electromagnetic fields of the currents to act at right angles to each other, two electron tubes operating according to the square law, and means for connecting the sliders to the respective electron tubes to produce voltages of values respectively corresponding to the squares of the voltages of the respective potentiometers, and a third electric circuit in which current flows under the influence of the sum of the said voltages of the electron tubes.

9. An electric system comprising two potentiometers each having a slider, electric circuits in which currents respectively flow under the influence of the voltages of the potentiometers, means for causing the electromagnetic fields of the currents to act at right angles to each other, two electron tubes operating according to the square law, means for connecting the sliders to the respective electron tubes to produce voltages of values respectively corresponding to the squares of the voltages of the respective potentiometers, a third electric circuit in which current flows under the influence of the sum of the said voltages of the electron tubes, a third electron tube operating to produce a further voltage, a fourth electric circuit in which current flows under the influence of the further voltage, and means for causing the electromagnetic fields of the currents in the third and fourth circuits to oppose each other.

10. An electric system comprising two adjustable voltage sources, electric circuits in which currents respectively flow under the influence of the voltages of the voltage sources, means for causing the electromagnetic fields of the currents to act at right angles to each other, electron-tube means operating according to the square law and connected to the respective voltage sources to produce voltages that shall respectively correspond to the squares of the voltages of the voltage sources, a third electric circuit in which current flows under the influence of a voltage corresponding to the sum of the said squares, a third voltage source, a fourth electric circuit in which current flows under the influence of the voltage of the third voltage source, and means for causing the electromagnetic fields of the currents in the third and fourth electric circuits to oppose each other.

11. An electric system for finding a first value and a second value that are respectively equal to a third value multiplied by the sine of an angle and the third value multiplied by the cosine of the angle, the system comprising two adjustable first and second voltage sources, electric circuits in which currents respectively flow under the influence of the voltages of the voltage sources, means for causing the electromagnetic fields of the currents to act at right angles to each other to facilitate obtaining the ratio of the said values of the voltages of the voltage sources, electron-tube means operating according to the square law and connected to the respective voltage sources to produce voltages that shall respectively correspond to the squares of the voltages of the voltage sources, a third electric circuit in which current flows under the influence of a voltage corresponding to the sum of the said squares, a third voltage source adjustable to produce a voltage of value corresponding to the square of the third value, a fourth electric circuit in which current flows under the influence of the voltage of the third voltage source, means for causing the electromagnetic fields of the currents in the third and fourth electric circuits to oppose each other, and means for adjusting the voltages of the first and second voltage sources to values such that their ratio shall correspond to the tangent of the angle and such that the currents in the third and fourth electric circuits shall be equal, whereby the adjustments of the voltages of the first and second voltage sources will respectively be measures of the first and second values.

12. With the aid of adjustable first, second, third, fourth, fifth and sixth voltages, a method of finding a first value and a second value that are respectively equal to a third value multiplied by the sine of an angle and the third value multiplied by the cosine of the angle, the said method comprising adjusting the third and fourth voltages to values corresponding respectively to the squares of the adjusted values of the first and second voltages, sending a current through a conductor, adjusting the current to create a seventh voltage of value corresponding to the sum of the said squares, adjusting the fifth voltage to a value corresponding to the third value, adjusting the sixth voltage to a value corresponding to the square of the adjusted fifth voltage, sending a current through a second conductor under the influence of the adjusted sixth voltage, causing the electromagnetic fields of the said currents to oppose each other, and adjusting the first and second voltages to values such that their ratio shall correspond to the tangent of the angle and such that the value of the seventh voltage shall correspond to the said adjusted value of the sixth voltage, whereby the adjusted first and second voltages will respectively be measures of the first and second values.

13. An electric system for finding a first value and a second value that are respectively equal to a third value multiplied by the sine of an angle and the third value multiplied by the cosine of the angle, the system comprising three adjustable voltage sources, electric circuits in which currents respectively flow under the influence of the voltages of two of the voltage sources, means for causing the electromagnetic fields of the currents to act at right angles to each other to facilitate obtaining the ratio of the said values of the voltages of the said two voltage sources, means for adjusting the voltage of the third voltage source to a value corresponding to the third value, means controlled by the voltage of the third voltage source for producing a further voltage corresponding to the square of the third value, and means for adjusting the voltages of the said two voltage sources to values such that their said ratio shall correspond to the tangent of the angle and such that the sum of their squares shall correspond to the value of the further voltage, whereby the said adjusted values of the voltages of the said two voltage sources will respectively be measures of the first and second values.

14. An electric system for finding a first value and a second value that are respectively equal to a third value multiplied by the sine of an angle and the third value multiplied by the cosine of the angle, the system comprising adjustable first, second, third, fourth and fifth voltage sources, means controlled in accordance with the adjusted values of the voltages of the first and second voltage sources for adjusting the voltages of the third and fourth voltage sources to values corresponding respectively to the squares of the said adjusted values of the voltages of the first and second voltage sources, electric circuits in which currents respectively flow under the influence of the said voltages of the first and second voltage sources, means for causing the electromagnetic fields of the said currents to act at right angles to each other to facilitate obtaining the ratio of the said adjusted values of the voltages of the first and second voltage sources, means for adjusting the voltage of the fifth voltage source to a value corresponding to the third value, means controlled by the voltage of the fifth voltage source for producing a further voltage corresponding to the square of the third value, and means for adjusting the said voltages of the first and second voltage sources to values such that their said ratio shall correspond to the tangent of the angle and such that the sum of the said adjusted values of the voltages of the third and fourth voltage sources shall correspond to the value of the further voltage, whereby the said adjusted values of the voltages of the first and second voltage sources will respectively be measures of the first and second values.

15. An electric system for finding a first value and a second value that are respectively equal to a third value multiplied by the sine of an angle and the third value multiplied by the cosine of the angle, the system comprising adjustable first, second, third, fourth and fifth voltage sources, means controlled in accordance with the adjusted values of the voltages of the first and second voltage sources for adjusting the voltages of the third and fourth voltage sources to values corresponding respectively to the squares of the said adjusted values of the voltages of the first and second voltage sources, electric circuits in which currents respectively flow under the influence of the said voltages of the first and second voltage sources, means for causing the electromagnetic fields of the said currents to act at right angles to each other to facilitate obtaining the ratio of the said adjusted values of the voltages of the first and second voltage sources, means for creating a sixth voltage of value corresponding to the sum of the said adjusted values of the voltages of the third and fourth voltage sources, means for adjusting the voltage of the fifth voltage source to a value corresponding to the third value, means controlled by the voltage of the fifth voltage source for producing a further voltage corresponding to the square of the third value, electric circuits in which currents respectively flow under the influence of the further voltage and the sixth voltage, means for causing the electromagnetic fields of the last-named currents to oppose each other, and means for adjusting the said voltages of the first and second voltage sources to values such that their said ratio shall correspond to the tangent of the angle and such that the value of the sixth voltage shall correspond to the value of the further voltage, whereby the said adjusted values of the voltages of the first and second voltage sources will respectively be measures of the first and second values.

16. An electric system for finding a first value and a second value that are respectively equal to a third value multiplied by the sine of an angle and the third value multiplied by the cosine of the angle, the system comprising two potentiometers, electric circuits in which currents respectively flow under the influence of the voltages of the potentiometers, means for causing the electromagnetic fields of the said currents to act at right angles to each other to facilitate obtaining the ratio of the said values of the voltages of the potentiometers, a voltage source, means for adjusting the voltage of the voltage source to a value corresponding to the third value, means controlled by the voltage of the voltage source for producing a further voltage corresponding to the square of the third value, and means for adjusting the potentiometers so that the said ratio of their voltages shall correspond to the tangent of the angle and such that the sum of the squares of their voltages shall correspond to the value of the further voltage, whereby the adjustments of the potentiometers will respectively be measures of the first and second values.

17. An electric system for finding a first value and a second value that are respectively equal to a third value multiplied by the sine of an angle and the third value multiplied by the cosine of the angle, the system comprising two adjustable voltage sources, electric circuits in which currents respectively flow under the influence of the voltages of the voltage sources, means for causing the electromagnetic fields of the currents to act at right angles to each other to facilitate obtaining the ratio of the said values of the voltages of the voltage sources, an electron tube operating in response to an input voltage according to the square law, means for adjusting the input voltage of the electron tube to produce a voltage of value corresponding to the square of the third value, and means for adjusting the voltages of the voltage sources to values such that their said ratio shall correspond to the tangent of the angle and such that the sum of their squares shall correspond to the adjusted value of the voltage of the electron tube, whereby the said adjusted values of the voltages of the voltage sources will respectively be measures of the first and second values.

18. An electric system comprising two adjustable voltage sources, electric circuits in which currents respectively flow under the influence of the voltages of the voltage sources, means for causing the electromagnetic fields of the currents to act at right angles to each other to facilitate obtaining the ratio of the said values of the voltages of the voltage sources, means connected to the respective voltage sources for producing voltages of values respectively corresponding to the squares of the voltages of the respective voltage sources, an electron tube operating according to the square law to produce a voltage, and means for adjusting the voltages of the voltage sources to values such that their said ratio shall correspond to a predetermined value and such that the sum of their squares shall correspond to the value of the voltage produced by the electron tube.

19. An electric system for finding the height H and the ground range G of an object with the aid of its angle $\alpha$ of elevation and its range R as obtained from range-finding equipment provided with a potentiometer having a slider the position of which corresponds to the range R, the said system comprising three adjustable voltage sources, electric circuits in which currents respectively flow under the influence of the voltages of two of the voltage sources, means for causing the electromagnetic fields of the said currents to act at right angles to each other to facilitate obtaining the ratio of the said values of the voltages of the said two voltage sources, means controlled by the slider for adjusting the voltage of the third voltage source to a value corresponding to the square of the range R, and means for adjusting the voltages of the said two voltage sources to values such that their said ratio shall correspond to the tangent of the angle $\alpha$ and such that the sum of their squares shall correspond to the adjusted value of the third voltage source, whereby the said adjusted values of the voltages of the said two voltage sources will respectively be measures of the height H and the ground range G.

20. An electric system having, in combination, two potentiometers each having a slider, two electron tubes operating according to the square law, means for connecting the sliders to the respective tubes to produce voltages that shall respectively correspond to the squares of the voltages determined by the sliders on the respective potentiometers, two coils respectively connected to the potentiometers and disposed so that their electromagnetic fields shall act at right angles to each other, a further coil connected to the electron tubes so as to be subjected to a voltage corresponding to the sum of the said squares, a third potentiometer having a third slider, a third electron tube operating according to the square law, means for connecting the third slider to the third electron tube to produce a voltage that shall correspond to the square of the voltage determined by the slider on the third potentiometer, and a coil opposing the further coil connected to the third electron tube.

21. An electric system having, in combination, two variable voltages, electric circuits in which currents flow under the influence of the voltages, means for causing the electromagnetic fields of the said currents to act at right angles to each other, means for producing third and fourth voltages the values of which are respectively equal to the squares of the said two voltages, means for producing a fifth voltage equal to the sum of the said squares, a sixth voltage, means for producing a seventh voltage the value of which is equal to the square of the sixth voltage, electric circuits in which currents flow under the influence of the sixth and seventh voltages, and means for causing the electromagnetic fields of the last-named currents to oppose each other.

22. An electric system for finding the height H and the ground range G of an object comprising means for detecting and tracking the object, means cooperating with the detecting and tracking means for continuously indicating the range R of the object, means cooperating with the detecting and tracking means for continuously indicating the angle α of elevation of the object, three adjustable voltage sources, electric circuits in which currents respectively flow under the influence of the voltages of two of the voltage sources, means for causing the electromagnetic fields of the said currents to act at right angles to each other to facilitate obtaining the ratio of the said values of the voltages of the said two voltage sources, means controlled by the range-indicating means for adjusting the voltage of the third voltage source to a value corresponding to the square of the range R, and means for adjusting the voltages of the said two voltage sources to values such that their said ratio shall correspond to the tangent of the angle α indicated by the angle-indicating means and such that the sum of their squares shall correspond to the adjusted value of the voltage of the third voltage source, whereby the said adjusted values of the voltages of the said two voltage sources will respectively be measures of the height H and the ground range G.

23. An electric system for finding the height H and the ground range G of an object comprising means for detecting and tracking the object, means cooperating with the detecting and tracking means for continuously indicating the range R of the object, means cooperating with the detecting and tracking means for continuously indicating the angle α of elevation of the object, adjustable first, second, third, fourth and fifth voltage sources, means controlled in accordance with the adjusted values of the voltages of the first and second voltage sources for adjusting the voltages of the third and fourth voltage sources to values corresponding respectively to the squares of the said adjusted values of the voltages of the first and second voltage sources, electric circuits in which currents respectively flow under the influence of the said voltages of the first and second voltage sources, means for causing the electromagnetic fields of the said currents to act at right angles to each other to facilitate obtaining the ratio of the said adjusted values of the voltages of the first and second voltage sources, means controlled by the range-indicating means for adjusting the voltage of the fifth voltage source to a value corresponding to the square of the range R, and means for adjusting the said voltages of the first and second voltage sources to values such that their said ratio shall correspond to the tangent of the angle α indicated by the angle-indicating means and such that the sum of the said adjusted values of the voltages of the third and fourth voltage sources shall correspond to the said adjusted value of the voltage of the fifth voltage source, whereby the said adjusted values of the voltages of the first and second voltage sources will respectively be measures of the height H and the ground range G.

24. An electric system for finding the height H and the ground range G of an object comprising means for detecting and tracking the object, means cooperating with the detecting and tracking means for continuously indicating the range R of the object, means cooperating with the detecting and tracking means for continuously indicating the angle α of elevation of the object, adjustable first, second, third, fourth and fifth voltage sources, means controlled in accordance with the adjusted values of the voltages of the first and second voltage sources for adjusting the voltages of the third and fourth voltage sources to values corresponding respectively to the squares of the said adjusted values of the voltages of the first and second voltage sources, electric circuits in which currents respectively flow under the influence of the said voltages of the first and second voltage sources, means for causing the electromagnetic fields of the said currents to act at right angles to each other to facilitate obtaining the ratio of the said adjusted values of the voltages of the first and second voltage sources, means for creating a sixth voltage of value corresponding to the sum of the said adjusted values of the voltages of the third and fourth voltage sources, means controlled by the range-indicating means for adjusting the voltage of the fifth voltage source to a value corresponding to the square of the range R, electric circuits in which currents respectively flow under the influence of the voltage of the fifth voltage source and the sixth voltage, means for causing the electromagnetic fields of the last-named currents to oppose each other, and means for adjusting the said voltages of the first and second voltage sources to values such that their said ratio shall correspond to the tangent of the angle α indicated by the angle-indicating means and such that the value of the sixth voltage shall correspond to the said adjusted value of the voltage of the fifth voltage source, whereby the said adjusted values of the voltages of the first and second voltage sources will respectively be measures of the height H and the ground range G.

25. A method of finding the ground range G and the height H of an object comprising measuring the range R and the angle α of elevation of the object, and continuously and synchronously with the measurement of the range R adjusting a voltage to a value corresponding to the square of the measured range R and adjusting two further voltages to values such that their ratio shall correspond to the tangent of the measured angle α and such that the sum of their squares shall correspond to the adjusted first-named voltage, whereby the said adjusted two further voltages will respectively be measures of the ground range G and the height H of the object.

26. With the aid of adjustable first, second, third, fourth and fifth voltages, a method of finding the ground range G and the height H of an object comprising measuring the range R and the angle α of elevation of the object, adjusting the third and fourth voltages to values corresponding respectively to the squares of the adjusted values of the first and second voltages, and continuously and synchronously with the measurement of the range R adjusting the fifth voltage to a value corresponding to the square of the measured range R and adjusting the first and second voltages to values such that their ratio shall correspond to the tangent of the measured angle α and such that the sum of the said adjusted values of the third and fourth voltages shall correspond to the said adjusted value of the fifth voltage, whereby the said adjusted first and second voltages will respectively be measures of the ground range G and the height H of the object.

27. With the aid of adjustable first, second, third, fourth and fifth voltages, a method of finding the ground range G and the height H of an object comprising measuring the range R and the angle α of elevation of the object, adjusting the third and fourth voltages to values corresponding respectively to the squares of the adjusted values of the first and second voltages, sending a current through a conductor, adjusting the current to create a sixth voltage of value corresponding to the sum of the said squares, and continuously and synchronously with the measurement of the range R adjusting the fifth voltage to a value corresponding to the square of the measured range R, sending a current through a second conductor under the influence of the adjusted fifth voltage, causing the electromagnetic fields of the said currents to oppose each other, and adjusting the first and second voltages to values such that their ratio shall correspond to the tangent of the measured angle α and such that the value of the sixth voltage shall correspond to the said adjusted value of the fifth voltage, whereby the adjusted first and second voltages will respectively be measures of the ground range G and the height H of the object.

28. An electric system for finding the height H and the ground range G of an object comprising a radio-location equipment for determining the angle α of elevation and the range R of the object, the radio-location equipment being provided with a range potentiometer having a slider the position of which corresponds to the range R, three adjustable voltage sources, electric circuits in which currents respectively flow under the influence of the voltages of two of the voltage sources, means for causing the electromagnetic fields of the said currents to act at right angles to each other to facilitate obtaining the ratio of the said values of the voltages of the said two voltage sources, means controlled by the slider for adjusting the voltage of the third voltage source to a value corresponding to the square of the range R, and means for adjusting the voltages of the said two voltage sources to values such that their said ratio shall correspond to the tangent of the angle α and such that the sum of their squares shall correspond to the adjusted value of the third voltage source, whereby the said adjusted values of the voltages of the said two voltage sources will respectively be measures of the height H and the ground range G.

29. A method of finding the ground range G and the height H of an object comprising reflecting and scattering radio waves from the object, receiving the reflected and scattered radio waves and thereby measuring the range R and the angle α of elevation of the object, and continuously and synchronously with the measurement of the range R adjusting a voltage to a value corresponding to the square of the measured range R and adjusting two further voltages to values such that their ratio shall correspond to the tangent of the angle α and such that the sum of their squares shall correspond to the adjusted first-named voltage, whereby the said adjusted two further voltages will respectively be measures of the ground range G and the height H of the object.

30. An electric system for finding the height H and the ground range G of an object comprising a radio-location equipment having means for transmitting radio waves towards the object, means for receiving the transmitted waves after reflection and scatter from the object, means controlled in accordance with the received waves for determining the angle α of elevation of the object, cathode-ray-tube means, means controlled in accordance with the received waves for displaying upon the cathode-ray-tube means indications corresponding to the range R, a first adjustable voltage source, means for adjusting the voltage of the first voltage source in accordance with the indications in order that the adjusted voltage shall provide a measure of the range R, two further adjustable voltage sources, means for adjusting the voltages of the further voltage sources to values that may represent values related by a factor of proportionality to the sine and the cosine, respectively, of the angle α, and means controlled in accordance with the adjustment of the first voltage source for correlating the factor of proportionality to the range R in order that said adjusted values of the voltages of the said further voltage sources shall respectively provide measures of the height H and the ground range G.

31. An electric system for determining the height H and the ground range G of an object comprising a radio-location equipment having means for transmitting radio waves toward the object, means for receiving the transmitted waves after reflection and scatter from the object, means controlled in accordance with the received waves for determining the angle α of elevation of the object, cathode-ray-tube means, means controlled in accordance with the received waves for displaying upon the cathode-ray-tube means indications corresponding to the slant range R of the object, a first adjustable voltage-producing means, means for adjusting the first voltage-producing means in accordance with the indications of the cathode-ray-tube means in order that the adjusted voltage produced thereby shall provide a measure of the slant range R, second and third adjustable voltage-producing means, means for adjusting the second and third voltage-producing means to produce voltages that may represent values related by a factor of proportionality to the sine and the cosine, respectively, of the angle α, height-representing means for representing the adjustment of the second voltage-producing means, ground-range-representing means for representing the adustment of the third voltage-producing means, and means for modifying the representations of the height-representing means and the ground-range-representing means in accordance with the adjustment of the first voltage-producing means to correlate the factor of proportionality to the slant range R in order that the representations of the height-representing means and the ground-range-representing means shall respectively provide measures of the height H and the ground range G.

32. An electric system for determining the height H of an object comprising a radio-location equipment having means for transmitting radio waves toward the object, means for receiving the transmitted waves after reflection and scatter from the object, means controlled in accordance with the received waves for determining the angle α of elevation of the object, cathode-ray-tube means, means controlled in accordance with the received waves for displaying upon the cathode-ray-tube means indications corresponding to the slant range R of the object, a first adjustable voltage-producing means, means for adjusting the first voltage-producing means in accordance with the indications of the cathode-ray-tube means in order that the adjusted voltage produced thereby shall provide a measure of the slant range R, further adjustable voltage-producing means, means for adjusting the further voltage-producing means to produce voltages that may represent values related by a factor of proportionality to the sine of the angle $\alpha$, means for representing the adjustment of the further voltage-producing means, and means for modifying the representations of the representing means in accordance with the adjustment of the first voltage-producing means to correlate the factor of the proportionality to the slant range R in order that the representing means shall provide a measure of the height H.

33. An electric system for determining the ground range G of an object comprising a radio-location equipment having means for transmitting radio waves toward the object, means for receiving the transmitted waves after reflection and scatter from the object, means controlled in accordance with the received waves for determining the angle $\alpha$ of elevation of the object, cathode-ray-tube means, means controlled in accordance with the received waves for displaying upon the cathode-ray-tube means indications corresponding to the slant range R of the object, a first adjustable voltage-producing means, means for adjusting the first voltage-producing means in accordance with the indications of the cathode-ray-tube means in order that the adjusted voltage produced thereby shall provide a measure of the slant range R, further adjustable voltage-producing means, means for adusting the further voltage-producing means to produce voltages that may represent values related by a factor of proportionality to the cosine of the angle $\alpha$, means for representing the adjustment of the further voltage-producing means, and means for modifying the representations of the representing means in accordance with the adustment of the first voltage-producing means to correlate the factor of proportionality to the slant range R in order that the representing means shall provide a measure of the ground range G.

34. An electric system for determining the height H and the ground range G of an object comprising a radio-location equipment having means for transmitting radio waves toward the object, means for receiving the transmitted waves after reflection and scatter from the object, means controlled in accordance with the received waves for determining the angle $\alpha$ of elevation of the object, cathode-ray-tube means, means controlled in accordance with the received waves for displaying upon the cathode-ray-tube means indications corresponding to the slant range R of the object, an adjustable voltage-producing means, means for adjusting the voltage-producing means in accordance with the indications of the cathode-ray-tube means in order that the adjusted voltage produced thereby shall provide a measure of the slant range R, first and second adjustable voltage-producing potentiometers, means for adjusting the first and second potentiometers to produce voltages that may represent values related by a factor of proportionality to the sine and the cosine, respectively, of the angle $\alpha$, height-representing means for representing the adjustment of the first potentiometer, ground-range-representing means for representing the adjustment of the second potentiometer, and means for modifying the representations of the height-representing means and the ground-range-representing means in accordance with the adjustment of the voltage-producing means to correlate the factor of proportionality to the slant range R in order that the representations of the height-representing means and the ground-range-representing means shall respectively provide measures of the height H and the ground range G.

ROBERT HARVEY RINES.

REFERENCES CITED

The following references are of record in the file of this patent:

UNITED STATES PATENTS

| Number | Name | Date |
|---|---|---|
| 1,389,830 | Horne | Sept. 6, 1921 |
| 1,510,440 | Gilman | Sept. 30, 1924 |
| 2,444,770 | Tyler | July 6, 1948 |
| 2,444,771 | Tyler | July 6, 1948 |

FOREIGN PATENTS

| Number | Country | Date |
|---|---|---|
| 633,493 | Germany | Aug. 3, 1936 |
| 164,765 | Great Britain | June 23, 1921 |